(12) United States Patent
Labrot et al.

(10) Patent No.: US 11,262,610 B2
(45) Date of Patent: Mar. 1, 2022

(54) VEHICLE WINDOW PANE WITH POLYMER FILM WITH DEFINED DROPLET SIZE DISTRIBUTION

(71) Applicant: SAINT-GOBAIN GLASS FRANCE, Courbevoie (FR)

(72) Inventors: Michael Labrot, Aachen (DE); Florian Manz, Aachen (DE); Jefferson Do Rosario, Aachan (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 16/615,443

(22) PCT Filed: Jun. 26, 2018

(86) PCT No.: PCT/EP2018/067069
§ 371 (c)(1),
(2) Date: Nov. 21, 2019

(87) PCT Pub. No.: WO2019/020298
PCT Pub. Date: Jan. 31, 2019

(65) Prior Publication Data
US 2020/0174293 A1    Jun. 4, 2020

(30) Foreign Application Priority Data

Jul. 27, 2017    (EP) .................... 17183421

(51) Int. Cl.
*G02F 1/1334* (2006.01)
*B32B 17/10* (2006.01)
(Continued)

(52) U.S. Cl.
CPC ...... *G02F 1/1334* (2013.01); *B32B 17/10036* (2013.01); *B32B 17/10174* (2013.01);
(Continued)

(58) Field of Classification Search
CPC combination set(s) only.
See application file for complete search history.

(56) References Cited

U.S. PATENT DOCUMENTS 5,211,876 A    5/1993  Vaz et al.
6,355,315 B1 *  3/2002  Kubota ................. G02F 1/1334
                                               428/1.1
(Continued)

FOREIGN PATENT DOCUMENTS

CN        101768449 A     7/2010
DE    20 2013 006516 U1   11/2013
(Continued)

OTHER PUBLICATIONS

International Search Report as issued in International Patent Application No. PCT/EP2018/067069, dated Sep. 11, 2018.
(Continued)

*Primary Examiner* — Lauren Nguyen
(74) *Attorney, Agent, or Firm* — Pillsbury Winthrop Shaw Pittman LLP

(57) ABSTRACT

A vehicle window pane, includes, in this sequence, a first glass pane, one or a plurality of polymer layers, a PDLC layer, including a polymer matrix in which liquid crystal droplets are embedded, wherein an electrically conductive layer is arranged in each case on both sides of the PDLC layer, or an SPD layer, including a polymer matrix in which suspension droplets are embedded, in which light-polarizing particles are suspended, wherein an electrically conductive layer is arranged in each case on both sides of the SPD layer, one or a plurality of polymer layers, and a second glass pane, wherein, in the case of the PDLC layer, the liquid crystal droplets or, in the case of the SPD layer, the suspension
(Continued)

Figure 1:
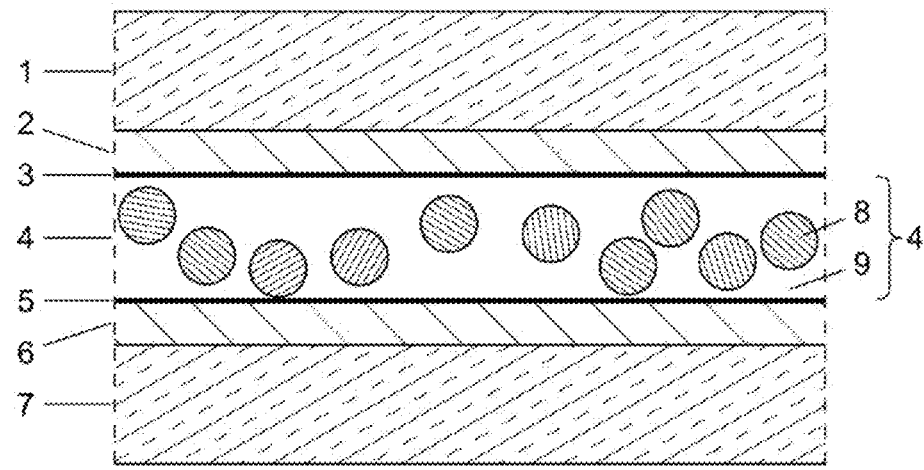

droplets have an average size of more than 2 μm. The vehicle window pane can be switched between a transparent state and a turbid or opaque state.

17 Claims, 5 Drawing Sheets

(51) Int. Cl.
*G02F 1/17* (2019.01)
*B60J 1/02* (2006.01)

(52) U.S. Cl.
CPC .. *B32B 17/10302* (2013.01); *B32B 17/10504* (2013.01); *B32B 17/10532* (2013.01); *G02F 1/172* (2013.01); *B32B 17/1077* (2013.01); *B32B 17/10761* (2013.01); *B32B 17/10788* (2013.01); *B60J 1/02* (2013.01)

(56) References Cited

U.S. PATENT DOCUMENTS

| | | | |
|---|---|---|---|
| 6,710,823 | B2 | 3/2004 | Faris et al. |
| 2005/0206832 | A1 | 9/2005 | Tahara et al. |
| 2012/0307337 | A1* | 12/2012 | Bartug .............. B32B 17/10229 359/245 |
| 2014/0028965 | A1* | 1/2014 | Kadowaki ......... G02F 1/133365 349/183 |
| 2015/0331296 | A1* | 11/2015 | Mennig ................. B32B 37/12 359/296 |

FOREIGN PATENT DOCUMENTS

| | | |
|---|---|---|
| DE | 10 2013 214249 A1 | 1/2015 |
| EP | 0 551 138 A1 | 7/1993 |
| EP | 0 564 869 A1 | 10/1993 |
| EP | 0 598 086 A1 | 5/1994 |
| EP | 2 704 903 A1 | 3/2014 |
| JP | H02-091622 A | 3/1990 |
| JP | H07-175043 A | 7/1995 |
| JP | H09-189898 A | 7/1997 |
| JP | 2009-500161 A | 1/2009 |
| JP | 2009-148707 A | 7/2009 |
| JP | 2010-531468 A | 9/2010 |
| JP | 2011-153217 A | 8/2011 |
| KR | 10-2006-0089205 A | 8/2006 |
| KR | 10-2015-0081274 A | 7/2015 |
| WO | WO 93/24589 A2 | 12/1993 |
| WO | WO 2009/000521 A1 | 12/2008 |
| WO | WO 2012/154663 A1 | 11/2012 |
| WO | WO 2013/110564 A | 8/2013 |
| WO | WO 2014/043139 A2 | 3/2014 |
| WO | WO 2016/008375 A1 | 1/2016 |

OTHER PUBLICATIONS

Office Action as issued in Japanese Patent Application No. 2020-518580, dated Oct. 27, 2020.
Office Action as issued in Korean Patent Application No. 10-2020-7001859, dated Oct. 29, 2020.
Second Notice of Preliminary Rejection as issued in Korean Patent Application No. 10-2020-7001859, dated Jul. 22, 2021.

* cited by examiner

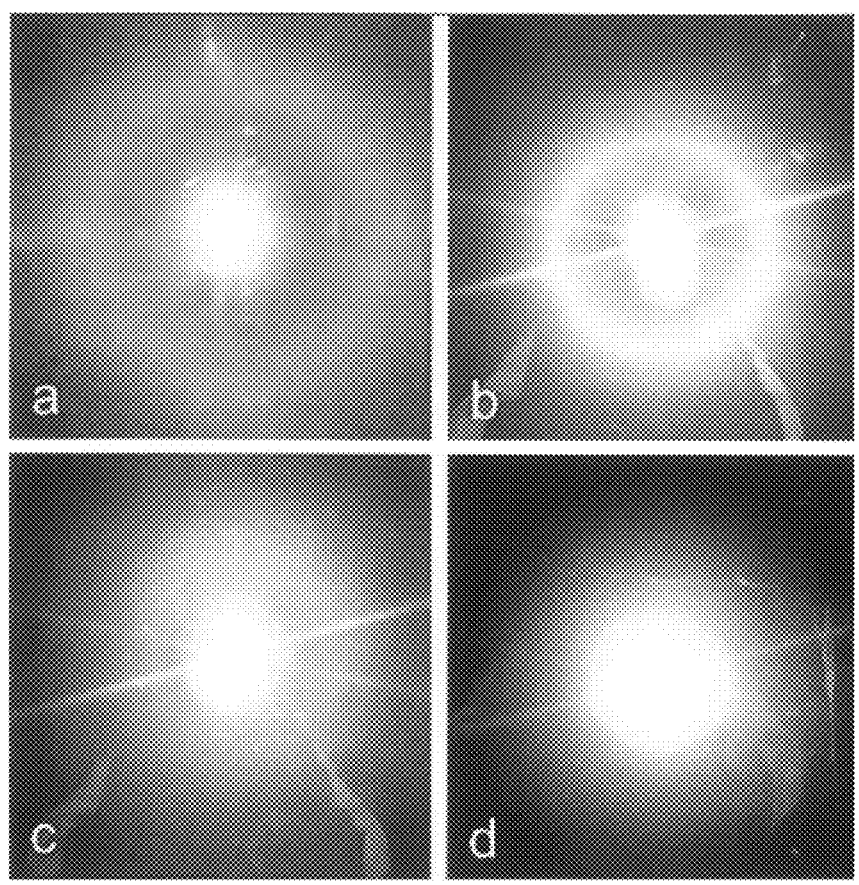
Fig. 3a-d

VEHICLE WINDOW PANE WITH POLYMER FILM WITH DEFINED DROPLET SIZE DISTRIBUTION

CROSS-REFERENCE TO RELATED APPLICATIONS

This application is the U.S. National Stage of PCT/EP2018/067069, filed Jun. 26, 2018, which in turn claims priority to European patent application number 17183421.1 filed Jul. 27, 2017. The content of these applications are incorporated herein by reference in their entireties.

The invention relates to a vehicle window pane, whose light transmittance can be changed by applying an electric voltage, in particular it can be switched between a transparent state and a turbid or opaque state.

Such panes, also referred to as PDLC glass (English: smart glazing) or intelligent glass, contain a PDLC layer (PDLC=polymer dispersed liquid crystal) as an active layer, by means of which the pane can be switched between a transparent state and a turbid or opaque state.

The PDLC layer comprises a polymer matrix, in which liquid crystal droplets are embedded, which is situated between two transparent electrically conductive layers (electrodes) and to which an electric field can be applied. Without an electric field, the liquid crystal droplets are not aligned, resulting in the turbid or opaque state of the panes. Upon application of an electric field, the liquid crystal droplets are aligned in the same direction and the PDLC layer becomes transparent. The process is reversible.

PDLC glass is used, for example, as windows for buildings. In the case of buildings, usually multiple thick panes, of 6 mm, for example, are used. Systems with three panes that are separated by a hollow space are common. In such panes, PDLC layers can be laminated between a conventional pane and an additional pane onto which an inner pane is laminated or retrofitted onto the inner side.

Panes made of PDLC glass are also of interest for vehicles, for example, in a sunroof, as a glass roof, as a rear window or as a rear side window. In the turbid or opaque state, the PDLC pane can block direct sunlight and protect privacy.

However, a disadvantage with vehicle window panes or panes containing PDLC layers consists in that, in the transparent state of the pane, a relatively strong corona effect can develop when light from a light source, usually the sun, passes through the pane. A concentric ring pattern, referred to as a corona, forms around the light source. The central bright region of the corona, also referred to as an aureole, looks like a bluish white disk, that fades to reddish-brown toward the edge. At the outer edge of the corona, the observer sometimes perceives the colors of the rainbow, also referred to as a rainbow effect. In the case of vehicle window panes, these effects play a pronounced role due to the short distance from the observer and the tinting of the pane frequently desired for vehicles. In other applications of panes with PDLC layers, e.g., as windows in buildings, the effects are rather negligible.

When the observer is far from the vehicle window pane, the corona is less visible. However, in the transparent state of the vehicle window pane, the corona is pronounced when the observer is situated near the PDLC pane. The effect is even stronger when the PDLC pane is inclined. Consequently, for vehicle occupants, the effect is disturbing since they are situated near the window pane, e.g., a sunroof. When looking through a sunroof or glass roof in the direction of the sun, the viewing angle is also inclined, further aggravating the situation. The color effects of the corona also disturb the vehicle occupants.

Another known technique for providing panes that can be switched between a transparent state and a turbid or opaque state is SPD technology, in which an SPD layer (SPD=suspended particle device) is included as an active layer in the pane. Usually, no opaque state is obtained with SPD layers. The principle is similar to that with PDLC layers, except that with the SPD layer, instead of liquid crystal droplets, suspension droplets, in which light-polarizing particles are suspended, are embedded in a polymer matrix. Such systems are, for example, described in EP 0551138 A1. In panes containing SPD layers the aforementioned corona effect and, possibly, the rainbow effect are also observed in the same manner in the transparent state.

WO 2016/008375 A1 relates to a switchable glass structure in which a PDLC layer is arranged between a first glass and a second glass, which layer comprises a polymer layer and liquid crystal microspheres dispersed therein, wherein the first and/or the second glass is provided with an anti-radiation coating.

DE 102013214249 A1 describes the production of a film composite, which can be a PDLC film or an SPD film.

DE 202013006516 U1 relates to a system with a PDLC layer situated between two electrodes, which layer contains a liquid crystal mixture which forms microdroplets dispersed in a polymer matrix, wherein the mass content of the liquid crystal mixture is between 40 and 70%, the PDLC layer has a thickness between 5 and 25 µm and the mean diameter of the liquid crystal droplets dispersed in the polymer matrix is between 0.25 µm and 2.00 µm.

The object of the invention is, consequently, to provide a vehicle window pane of the type mentioned in the introduction with a PDLC layer or an SPD layer that exhibits a weakened corona effect and, possibly, also a weakened rainbow effect or with which these effects are largely eliminated.

According to the invention, this object is accomplished by a vehicle window pane according to claim 1. The invention also relates, according to the other independent claims, to a vehicle that includes such a pane and the use of the pane according to the invention as a vehicle window pane. Preferred embodiments of the invention are reported in the dependent claims.

The invention thus relates to a vehicle window pane, that comprises, in this sequence:
 a. a first glass pane (1),
 b. one or a plurality of polymer layers (2),
 c. a PDLC layer (4), comprising a polymer matrix (9) in which liquid crystal droplets (8) are embedded, wherein an electrically conductive layer (3, 5) is arranged in each case on both sides of the PDLC layer, or an SPD layer, comprising a polymer matrix in which suspension droplets are embedded, in which light-polarizing particles are suspended, wherein an electrically conductive layer is arranged in each case on both sides of the SPD layer,
 d. one or a plurality of polymer layers (6), and
 e. a second glass pane (7),
characterized in that in the case of the PDLC layer, the liquid crystal droplets or, in the case of the SPD layer, the suspension droplets have an average size of more than 2 µm. Preferably, in the case of the PDLC layer, the liquid crystal droplets or, in the case of the SPD layer, the suspension droplets, have an average size of more than 2 µm with a relative standard deviation of more than 30%.

The vehicle window pane according to the invention exhibits, compared to prior art vehicle window panes containing PDLC layers or SPD layers, a significantly weakened corona effect. The size or the diameter of the corona is significantly reduced. The optical quality of the panes is improved. Disturbing effects for the vehicle occupants are avoided or at least reduced thereby.

In particular, when the liquid crystal droplets or suspension droplets have, in preferred embodiments, an average size of more than 2 µm with a relative standard deviation of more than 30%, the contrast between the colors in the corona and in the rainbow region also decreases significantly, and the colors fade (rainbow effect). This improves the optical quality of the panes even further.

By adjusting the size of the liquid crystal droplets or suspension droplets in a larger range, the size of the corona is reduced. Through the use of liquid crystal droplets or suspension droplets with a quite large standard deviation, i.e., inhomogeneous particle size distribution, the contrast between the colors is reduced such that the colors fade and possibly disappear completely.

Figure 2A:
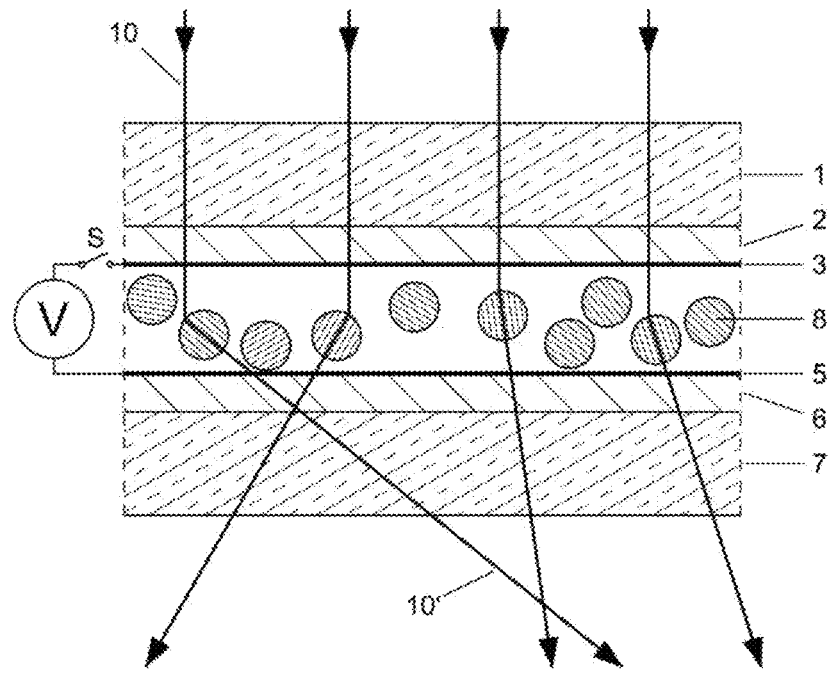
Figure 2B:
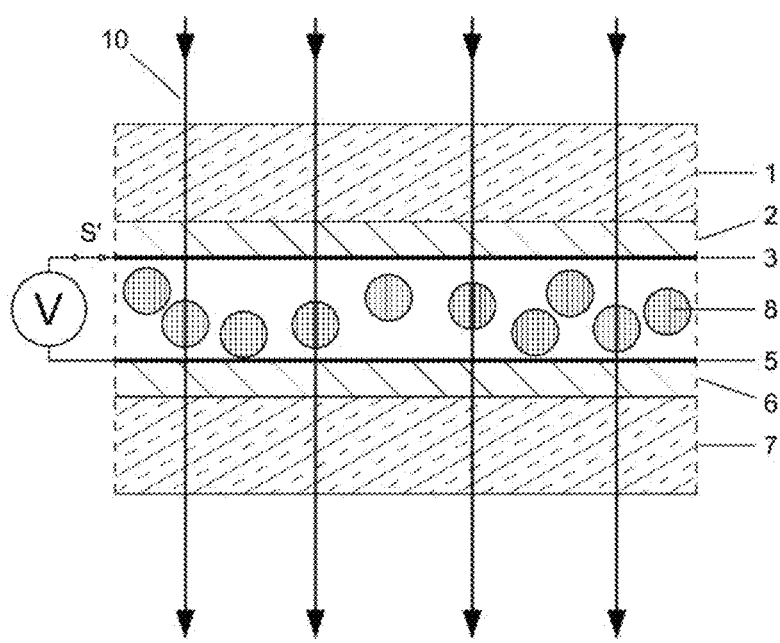
Figure 4:
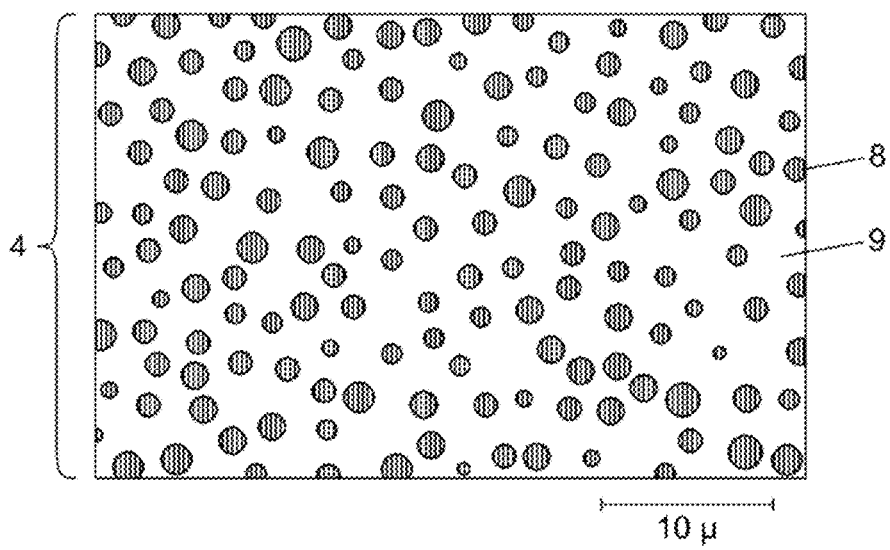
Figure 5:
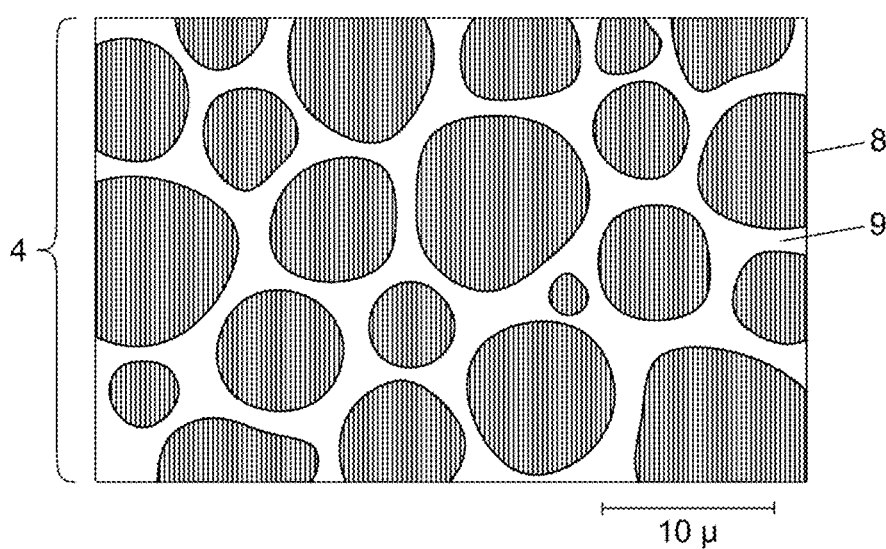
Figures 6A, 6B:
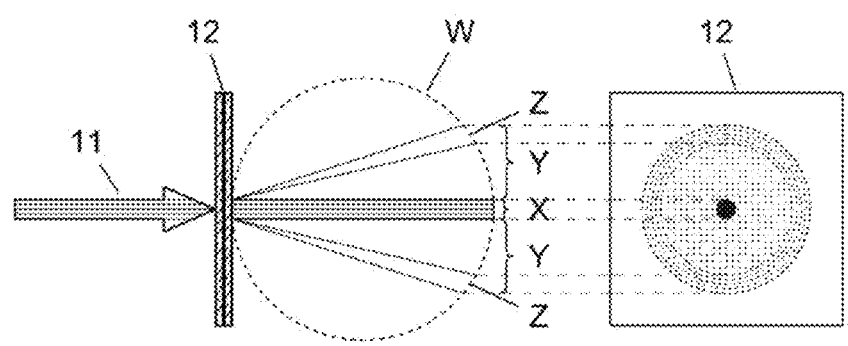

The invention is explained in detail in the following with reference to the accompanying drawings. They depict:

FIG. 1 a schematic representation of a vehicle window pane with PDLC layer according to the invention;

FIG. 2*a-b* a schematic representation of a vehicle window pane with PDLC layer in the turbid or opaque state (FIG. 2*a*) and in the transparent state (FIG. 2*b*);

FIG. 3*a-d* photographs of the sun through vehicle window panes not according to the invention (FIG. 3*a-c*) and a vehicle window pane according to the invention (FIG. 3*d*);

FIG. 4 a schematic representation of the microstructure of a PDLC layer in cross-section;

FIG. 5 a schematic representation of the microstructure of another PDLC layer in cross-section;

FIG. 6*a-b* a schematic representation of the corona effect and of the rainbow effect.

The vehicle window panes according to the invention or the PDLC layer or SPD layer can be reversibly switched between a transparent state and a turbid or opaque state, in other words, the light scattering of the pane can be variably adjusted. For this purpose, the vehicle window pane is connected, via the electrically conductive layers, to a voltage source that can be switched on and off.

In the turbid or opaque state, the light transmittance is reduced such that the vehicle window pane becomes opaque, i.e., non-transparent, or cloudy, i.e., less transparent.

When an electric field is applied by switching the voltage source on, the liquid crystal droplets of the PDLC layer or the suspension droplets of the SPD layer align themselves and the PDLC layer or SPD layer becomes transparent. When the voltage source is switched off such that no electric field is present, the liquid crystal droplets of PDLC layer or the suspension droplets are not homogeneously aligned, the light becomes scattered, and the PDLC layer or SPD layer is turbid or opaque. The process is reversible. The principle is further explained in the following with reference to FIG. 2*a-b*.

Window panes that have a PDLC layer (PDLC=polymer dispersed liquid crystal) or an SPD layer (SPD=suspended particle device) and can be reversibly switched between a transparent state and a turbid or opaque state are known.

The above-described corona effect with PDLC and SPD layers when viewing a light source such as the sun through the pane is created by a scattering of the light on the liquid crystal droplets or suspension droplets in the window pane. FIG. 6 presents the effect schematically. A similar effect is also known in meteorology when sunlight or moonlight is scattered by water droplets in clouds.

The vehicle window pane according to the invention has a PDLC layer or an SPD layer. The PDLC layer includes or is a polymer matrix in which liquid crystal droplets are embedded, wherein the liquid crystal droplets have an average size of more than 2 µm, with the relative standard deviation of the average size preferably amounting to more than 30%. The liquid crystal droplets are liquid droplets of one or a plurality of liquid crystal compounds. The SPD layer includes or is a polymer matrix in which suspension droplets in which light-polarizing particles are suspended are embedded, wherein the suspension droplets have an average size of more than 2 µm, with the relative standard deviation of the average size preferably amounting to more than 30%. The suspension droplets are droplets of a suspension liquid in which light-polarizing particles are suspended.

The average size of the liquid crystal droplets or of the suspension droplets can be, for example, as much as 30 µm, but is preferably not more than 12 µm. In a preferred embodiment, the average size of the liquid crystal droplets or of the suspension droplets is 3 to 10 µm, more preferably 4 to 8 µm. This is advantageous in terms of a further reduced corona. The relative standard deviation of the average size of the liquid crystal droplets or of the suspension droplets is preferably more than 30% and/or not more than 80%.

The average size refers here to the arithmetic mean. The relative standard deviation as a measure of the droplet size distribution is here, as usual, the quotient of the standard deviation of the arithmetic mean and the arithmetic mean expressed as a percentage. The relative standard deviation is also referred to as the coefficient of variation.

The average size and the standard deviation of the liquid crystal droplets in the PDLC layer or of the suspension droplets in the SPD layer are, here, the average size and standard deviation that is determined by measuring the diameters of at least 50 liquid crystal droplets or suspension droplets in a scanning electron microscope (SEM) image of a cross-section of the PDLC layer or the SPD layer and by calculating the arithmetic mean of the diameters measured on the image and the standard deviation. When the droplets in the image are not spherical, the major-axis diameter (greatest diameter) is selected. It should be noted that the liquid crystal droplets or suspension droplets are mesogenic liquids which that leak out of the polymeric matrix upon creation of the cross-sections of the PDLC layer or the SPD layer such that, in fact, the cavities remaining in the polymer matrix, which correspond in shape and size to the droplets leaked are measured.

The liquid crystal droplets of the PDLC layer can contain one or a plurality of liquid crystal compounds. Common liquid crystals can be used. There are several different systems that are commercially available. Examples of suitable liquid crystals are described, for example, in EP 0 564 869 A1 and EP 0 598 086 A1. Also suitable is, for example, the product marketed by the company Merck under the name MDA-00-3506, which contains a mixture of 4-((4-ethyl-2, 6-difluorophenyl)-ethynyl)-4'-propylbiphenyl and 2-fluoro-4,4'-bis-(trans-4-propylcyclohexyl)-biphenyl. In a preferred embodiment, the liquid crystal droplets are nematic at ambient temperature (23° C.). Optionally, they also have positive dielectric anisotropy.

In a preferred embodiment, the proportion of liquid crystal droplets in the PDLC layer is, based on the total mass of liquid crystal droplets and polymer of the polymer matrix, 40-70 wt.-%, more preferably 50-70 wt.-%. In addition to the liquid crystal droplets and the polymer matrix, the PDLC layer can contain other components, for example, spacers made of a nonconductive material made of glass or plastic. The spacers are preferably transparent.

The suspension droplets of the SPD layer comprise droplets of a liquid suspension in which light-polarizing particles are suspended. Such systems are described, for example, in EP 0551138 A1.

The following information about the polymer matrix applies both for the polymer matrix of the PDLC layer and for the polymer matrix of the SPD layer, unless otherwise indicated. The polymer matrix is preferably transparent. The polymer matrix is preferably obtained by thermal polymerization or photopolymerization. The polymer matrix can, for example, be formed from a polymer of one or a plurality of vinyl or (meth)acrylate monomers and possibly vinyl or (meth)acrylate oligomers, an epoxy resin, or a urethane resin. The polymer matrix is preferably a (meth)acrylate polymer matrix. (Meth)acrylate means acrylate and/or methacrylate. Examples of vinyl or (meth)acrylate monomers and oligomers thereof are mono(meth)acrylate, di(meth)acrylate, N-substituted acrylamides, N-vinylpyrrolidones, styrene and its derivatives, vinyl chloride, polyester(meth) acrylate, epoxy(meth)acrylate, polyurethane(meth)acrylate, and polyether(meth)acrylate.

Preferably, the polymer matrix is the polymer of at least one monofunctional vinyl compound, preferably of an acrylate monomer or of a methacrylate monomer, at least one difunctional vinyl compound, preferably of a diacrylate monomer or of a dimethacrylate monomer, and, optionally, at least one mono-, di-, or polyfunctional vinyl oligomer, preferably of an acrylate oligomer or of a methacrylate oligomer.

A suitable monomer mixture for producing the polymer matrix includes, for example, 30-95 wt.-% of at least one monofunctional (meth)acrylate monomer, 1-60 wt.-% of at least one difunctional (meth)acrylate monomer, and 1-50 wt.-% of at least one mono-, di-, or polyfunctional (meth) acrylate oligomer, based on the total weight of the monomers and oligomers.

Various techniques have been developed for obtaining a PDLC layer with a polymer matrix with liquid crystal droplets embedded therein, which are used depending on the materials used. These techniques include thermally-induced phase separation (TIPS), solvent-induced phase separation (SIPS), and polymerization-induced phase separation (PIPS). In PIPS, the polymerization can be induced thermally or photochemically, for example, by UV radiation. PIPS is generally the preferred technique.

When a polymer precursor such as the aforementioned monomers, oligomers, or resins is miscible with a liquid crystal compound, polymerization-induced phase separation (PIPS) can be used. After homogeneous mixing of liquid crystals and polymer precursor material, the polymerization is initiated to induce phase separation. During polymerization, the solubility of the liquid crystals in the growing polymer network decreases until growing liquid crystal droplets form in the matrix that is forming and the polymer begins to gel. Droplet size, size distribution, and the morphology of the droplets are determined during the time between the droplet formation and the gelling of the polymer. Important factors are the polymerization rate, the relative concentrations of materials, the temperature, the type of liquid crystal and polymers used, and various other physical parameters, such as viscosity, solubility of the liquid crystal in the polymer.

Thermally-induced phase separation (TIPS) can be used for liquid crystal materials and thermoplastic materials that are capable of forming a homogeneous solution above the melting temperature of the polymer. The homogeneous solution of the liquid crystal in the thermoplastic melt is cooled below the melting point of the thermoplastic material, causing phase separation of the liquid crystal. The droplet size and distribution of the liquid crystal can be set, for example, by the cooling rate and material parameters.

In solvent-induced phase separation (SIPS), liquid crystal and a thermoplastic material are dissolved in a solvent. The subsequent evaporation of the solvent results in phase separation of the liquid crystal, droplet formation and growth, and polymer gelation.

The PDLC layer can have, for example, a thickness of 5 to 40 μm, preferably of 10 to 25 μm. The SPD layer can have, for example, a thickness of 50 to 150 μm, preferably of 80 to 110 μm.

The following information about the electrically conductive layer applies both for the electrically conductive layers that are arranged on both sides of the PDLC layer and for those that are arranged on both sides of the SPD layer, unless otherwise indicated. The electrically conductive layers are preferably transparent. The electrically conductive layers form electrodes that are in contact with the PDLC layer or the SPD layer and, in the pane according to the invention, are configured such that they can be connected to a voltage source.

The electrically conductive layer can contain transparent, conductive oxides (TCOs), i.e., materials that are both highly conductive and transparent in visible light. Examples are tin-doped indium oxide (ITO), antimony-doped or fluorine-doped tin oxide ($SnO_2$:F), or aluminum-doped zinc oxide (ZnO:Al), with ITO being preferred. An electrically conductive layer based on ITO can, for example, have a surface resistance of 50 to 200 ohms per square.

The thickness of the electrically conductive layers based on these transparent conductive oxides (TCOs) is preferably in the range from 50 to 100 nm. Known coating techniques are, for example, magnetron-enhanced cathodic sputtering, evaporation, sol-gel methods, or chemical vapor deposition (CVD).

The electrically conductive layer can also be a metal layer, preferably a thin layer or a stack of thin layers. Suitable metals are, for example, Ag, Al, Pd, Cu, Pd, Pt, In, Mo, Au. These metal coatings are referred to as TCC (transparent conductive coating). Typical thicknesses of the individual layers are in the range from 2 to 50 nm.

A large variety of PDLC layers and SPD layers, each of which has electrically conductive layers on the top and bottom, are commercially available. Usually, the two electrically conductive layers of the PDLC layer and the SPD layer are applied on a substrate made of polymer films. The polymer films can be, for example, polyester films, preferably polyethylene terephthalate (PET) films. Such a composite can be used for incorporation into the vehicle window pane according to the invention.

The vehicle window pane according to the invention is a composite glass pane in which the PDLC layer or the SPD layer is included as a functional layer. In addition, the vehicle window pane includes a first and a second glass pane laminated by one or a plurality of polymer films on both sides of the functional layer to form a solid composite.

The first glass pane and the second glass pane can be made of the same material or of a different material. The panes can be made of inorganic glass and/or organic glass (polymers). In a preferred embodiment, the first glass pane and/or the second glass pane contains glass and/or polymers, preferably flat glass, quartz glass, borosilicate glass, soda lime glass, aluminosilicate glass, polycarbonate, and/or polymethacrylate.

The first glass pane and the second glass pane can have the same thickness or different thicknesses. Preferably, the first glass pane and the second glass pane have, independently of one another, a thickness in the range from 0.4 to 4.0 mm, e.g., 0.4 to 3.85 mm, more preferably 1.6 to 2.5 mm. For mechanical reasons, the outer pane is preferably thicker or the same thickness as the inner pane. The inner pane is the glass pane that faces the interior of the vehicle when installed in the vehicle, whereas the outer pane faces outward.

In each case, one or a plurality of polymer layers is situated between the first glass pane and the PDLC layer or SPD layer and between the second glass pane and the PDLC layer or SPD layer. The following indications refer, independently of one another, to all these one or a plurality of polymer layers, unless otherwise indicated. Usually, appropriate commercially available polymer films are used as the starting material for the formation of the polymer layers. Preferably, at least one of the one or a plurality of polymer layers contains a thermoplastic polymer. The one or a plurality of polymer layers are preferably transparent, colorless, or tinted.

The one or a plurality of polymer layers can include as a laminating layer, for example, polyvinyl butyral, ethylene vinyl acetate, polyurethane, polypropylene, polyacrylate, polyethylene, polycarbonate, polymethyl methacrylate, polyvinyl chloride, polyacetate resin, casting resin, acrylate, fluorinated ethylene-propylene, polyvinyl fluoride, and/or ethylene-tetrafluoroethylene and/or a mixture and/or a copolymers thereof.

Preferably, at least one of the one or a plurality of polymer layers includes as a laminating layer polyvinyl butyral (PVB), ethylene vinyl acetate, polyurethane, and/or mixtures thereof and/or copolymers thereof, polyvinyl butyral being preferred.

The one or a plurality of polymer layers can optionally include, in addition to the aforementioned mentioned polymer laminating layers, additional polymer layers with other functions, for example, as a protective layer for the PDLC layer or SPD layer with the electrically conductive layers arranged above and below. The protective layer can, for example, be a polyester layer, preferably a polyethylene terephthalate (PET) layer. Other examples of polymer layers for specific functions are tinted PVB films, acoustic films, and IR-reflecting PET films or the layers made therefrom. If other polymer layers are included in addition to the laminating layer(s), the polymer layers arranged nearest the first and second glass pane are generally polymeric laminating layers.

The one or a plurality of polymer layers have, for example, in each case, a thickness of 0.04 to 1.5 mm, preferably 0.1 to 1.5 mm, more preferably of 0.3 to 0.9 mm, typically 0.38 mm, 0.76 mm, or 0.85 mm. The thickness of the layers can vary depending on the intended use. For example, in some embodiments, PET layers with a thickness of 0.05 mm and/or acoustic films with a thickness of 0.85 mm are used. The polymer layers used as a laminating layers preferably have a thickness of 0.1 to 1.5 mm, more preferably from 0.3 to 0.9 mm.

In a preferred embodiment, the vehicle window pane comprises, in this sequence, the first glass pane, at least one laminating layer as a first polymer layer, e.g., a PVB layer, at least one protective layer as a second polymer layer, the PDLC layer with the two electrically conductive layers on the top and bottom or the SPD layer with the two electrically conductive layers on the top and bottom, at least one protective layer as a second polymer layer, at least one laminating layer as a first polymer layer, e.g., a PVB layer, and the second glass pane.

In one embodiment, the vehicle window pane can be tinted and/or can include at least one coated glass as a first and/or second glass pane. Thus, the optical properties of the vehicle window pane can be modified. A tinted vehicle window pane can be obtained by using tinted glass panes and/or tinted polymer layers. In the vehicle window pane according to the invention, at least one glass pane selected from the first and the second glass pane is then a tinted glass pane and/or at least one polymer layer selected from the one or the plurality of polymer layers between the first glass pane and the PDLC layer or the SPD layer and the one or the plurality of polymer layers between the second glass pane and the PDLC layer or the SPD layer is a tinted polymer layer. For example, for tinted polymer layers, tinted PVB films and/or IR-reflecting PET films can be used. One example of a coated glass is low-E glass (low emissivity glass) or glass with an IR-reflecting coating. Low-E glasses are available commercially and are coated with one or a plurality of metal layers. The metal coating is very thin, e.g., has a thickness of approx. 100 nm. With the use of a coated glass pane as a first and/or second glass pane, the coating is preferably situated on the inner side of the glass pane relative to the vehicle window pane.

Of course, with a tinted vehicle window pane, the pane is tinted in the transparent state of the PDLC layer or the SPD layer.

In a preferred embodiment, the PDLC layer or the SPD layer is sealed laterally with an adhesive sealing compound and/or a thermoplastic strip. It is advantageous that the adhesive sealing compound and/or the thermoplastic strip protects the PDLC layer or the SPD layer against corrosion. It is understood that "laterally" refers to the side surfaces of the PDLC or SPD layer as opposed to the top and bottom of the PDLC or SPD layer.

The adhesive sealing compound can, for example, be a polyvinyl butyral (PVB) adhesive sealing compound and/or can be elaborated in the form of a picture frame. In the picture frame technique, the PDLC layer or the SPD layer does not reach all the way to the edge of the vehicle window pane, in other words, it is, in terms of area, smaller than the first and second glass pane and the polymer layers. The remaining edge is sealed circumferentially by the adhesive sealing compound, which has the same thickness as the PDLC layer or the SPD layer and, thus, also functions as a spacer. In this manner, the PDLC layer or SPD layer is laterally framed by the adhesive sealing compound.

The thermoplastic strip is a tape without adhesive that is attached circumferentially on the side surfaces of the PDLC layer or the SPD layer in the shape of a U such that the legs of the U lie on the top and bottom of the PDLC layer or the SPD layer.

The vehicle window pane according to the invention is suitable for all vehicles, for example, motor vehicles, trains, watercraft, or aircraft, with motor vehicles particularly preferred. Examples of suitable motor vehicles are buses, tractors, trucks, and passenger cars, with passenger cars particularly preferred.

The invention also relates to a vehicle, including at least one vehicle window pane according to the invention, the vehicle preferably being a motor vehicle. Suitable and preferred vehicles are mentioned above.

The invention further relates to the use of a pane according to the invention as a vehicle window pane, preferably in a sunroof, as a glass roof, as a rear window, as a roof edge in the B field of a windshield, or as a front or rear side window, preferably in a motor vehicle. Even use as a front pane is conceivable.

The vehicle window pane according to the invention is suitable for reducing the corona effect and, possibly, the rainbow effect in the transparent state of the vehicle window pane, which can result when an observer looks through the pane in the direction of a light source such as the sun.

The invention is further explained in the following using nonlimiting exemplary embodiments with reference to the accompanying drawings. FIG. 1 and FIG. 2a-b are schematic drawings, which also applies to the representation of the liquid crystal droplets; size and size distribution of the droplets are not depicted.

FIG. 1 depicts schematically a vehicle window pane according to the invention with a first glass pane 1, one or a plurality of polymer layers 2, and two electrically conductive layers 3 and 5 that are arranged on both sides of the PDLC layer 4. The PDLC layer 4 comprises a polymer matrix 9 in which liquid crystal droplets 8 are embedded. One or a plurality of polymer layers 6 are arranged between the electrically conductive layer 5 and the second glass pane 7. In the embodiment according to the invention, the liquid crystal droplets 8 of the PDLC layer 4 have an average size of more than 2 µm, preferably with a relative standard deviation of more than 30%. The one or a plurality of polymer layers 2 and 6 can consist in each case of at least one PVB film as a laminating layer that faces the first or second glass pane 1, 7, and at least one polyester film as a protective layer that faces the respective electrically conductive layer 3, 5. In particular, additional functional layers, for example, IR-reflecting layers, can be situated on the inner side of the first glass layer 1 and in the polymer layers 2. The electrically conductive layers 3, 5 can be transparent ITO coatings. A vehicle window pane according to the invention with an SPD layer has the same basic structure, except that the PDLC layer 4 includes an SPD layer with suspension droplets embedded in the polymer matrix, in which light-polarizing particles are suspended.

FIGS. 2a and 2b depict the mode of operation of the PDLC technique on a vehicle window pane according to FIG. 1. The pane is connected, via the two electrically conductive layers 3 and 5, to a voltage source V. By means of a switch S/S', the circuit can be closed (ON mode, S') and opened (OFF mode, S). In the ON mode, an electric field is applied, the liquid crystals 8 are aligned in an orderly manner and incident light 10 is scarcely scattered, resulting in a transparent PDLC layer and a transparent pane (FIG. 2b). When the electric current is switched off, the liquid crystals 8 are randomly oriented such that incident light 10 is scattered 10' and the PDLC layer and the pane become opaque or non-transparent (FIG. 2a). The technique is basically the same with SPD layers, wherein, there, the suspension droplets are oriented uniformly or arbitrarily.

FIGS. 1, 2a, and 2b are also purely schematic in terms of the light refraction shown. The theory concerning the different refraction of the light is as follows: the liquid crystal droplets or the suspension droplets are characterized by two different indices of refraction ne (in the ON mode, S') and n' (in the OFF mode, S). Light is refracted when the index of refraction of the surrounding polymer matrix np differs from the index of refraction of the liquid crystal droplet or of the suspension droplet in the OFF mode n'. Light is not refracted when the indices of refraction ne and np match. In the OFF mode, the droplets are arranged randomly, the index of refraction n' differs from the index of refraction np, the light is scattered, and the pane appears turbid or opaque. The liquid crystal molecules conform to the edge of the liquid crystal droplets. In the ON mode, the droplets orient themselves uniformly along the direction of the field applied, with the index of refraction ne being selected such that it roughly matches the refractive index np, ensuring high transmittance of the light and thus transmittance.

FIG. 6a-b illustrate a schematic representation of a corona Y with rainbow, i.e., the corona and rainbow effect, and their formation. The effect of sunlight 11 through a vehicle window pane with a PDLC layer 12 is depicted. The light is scattered in the vehicle window pane such that the observer perceives not only the sun in the direct region X, but also a corona Y including the colored rainbow region Z.

EXAMPLES

Four PDLC films A, B, C, and D were used for the production of vehicle window panes. The vehicle window panes produced were then investigated regarding the corona effect.

The following table shows values for average size of the liquid crystal droplets, standard deviation, relative standard deviation (standard deviation/average size in percent), and maximum droplet size of the PDLC films A, B, C, and D, which were determined on REM images as described above. FIG. 4 depicts schematically (not to scale) the microstructure of the PDLC layer 4, containing liquid crystal droplets 8 and polymer matrix 9, of the PDLC film A. FIG. 5 depicts schematically (not to scale) the microstructure of the PDLC layer 4, containing liquid crystal droplets 8 and polymer matrix 9, of the PDLC film D.

TABLE

| PDLC film | A | B | C | D |
|---|---|---|---|---|
| Average size liquid crystal droplets [µm] | 1.30 | 1.92 | 1.93 | 5.38 |
| Standard deviation [µm] | 0.24 | 0.41 | 0.59 | 1.97 |
| Relative standard deviation [%] | 18 | 21 | 31 | 37 |
| Maximum droplet size [µm] | 1.89 | 3.03 | 3.60 | 13.26 |

Vehicle window panes were produced with the PDLC films A, B, C, and D. For this, assemblies were formed that consisted of, in this sequence, a first glass pane, a PVB film, the PDLC film, a PVB film, and a second glass pane. These assemblies were laminated conventionally under elevated temperature and elevated pressure to form a composite glass. The vehicle window panes with the PDLC films A, B, C are reference panes. The vehicle window pane with the PDLC film D is according to the invention.

The vehicle window panes were examined for the corona effect. For this, the vehicle window panes were connected, via the electrically conductive layers (electrodes), to a voltage source. All the vehicle window panes exhibited good electro-optical properties with satisfactory opacity in the OFF mode (voltage source off) and transparency in the ON mode (voltage source on), with the voltage required for the transparent state relatively low.

To investigate the corona effect, a strong light source was positioned on one side of the vehicle window pane in the transparent state. From the other side of the pane, a photograph of the light source was then taken through the pane. The photographs are reproduced in FIG. 3a-d.

FIG. 3a shows the photograph for the vehicle window pane with the PDLC film A. The photograph shows a very wide, clearly blue ring around the light source.

FIG. 3b shows the photograph for the vehicle window pane with the PDLC film B. The photograph shows a wide, blue ring around the light source. At the edge of the ring, the color fades and changes to reddish-brown (rainbow effect).

FIG. 3c shows the photograph for the vehicle window pane with the PDLC film C. The photograph shows a wide, bluish ring around the light source. Compared to the photograph of FIG. 3b, the width of the corona is roughly comparable; however, the colors are less intense.

FIG. 3d shows the photograph for the vehicle window pane according to the invention with the PDLC film D. The photograph shows a small white ring around the light source. Compared to the photographs of FIG. 3a-c, in FIG. 3d, the width of the corona is significantly smaller. Moreover, the contrast between the colors is scarcely or virtually nonexistent, resulting in a white ring.

Overall, it should be noted that with the vehicle window pane according to the invention, the corona effect and, additionally, the rainbow effect are, significantly less pronounced compared to the reference panes. This improves the optical quality of the pane.

LIST OF REFERENCE CHARACTERS 1 first glass pane
2 one or a plurality of polymer layers
3 electrically conductive layer
4 PDLC layer or SPD layer
5 electrically conductive layer
6 one or a plurality of polymer layers
7 second glass pane
8 liquid crystal droplets
9 polymer matrix
10 incident light
10' scattered light
11 sunlight
12 vehicle window pane with PDLC layer
S switch (circuit open)
S' switch (circuit closed)
X direct region
Y corona
Z rainbow region
V voltage source

The invention claimed is:

1. A window pane, comprising, in this sequence:
   a. a first glass pane,
   b. one or a plurality of polymer layers,
   c. a PDLC layer, comprising a polymer matrix in which liquid crystal droplets are embedded, wherein an electrically conductive layer is arranged in each case on both sides of the PDLC layer, or an SPD layer, comprising a polymer matrix in which suspension droplets are embedded, in which light-polarizing particles are suspended, wherein an electrically conductive layer is arranged in each case on both sides of the SPD layer,
   d. one or a plurality of polymer layers, and
   e. a second glass pane,
   wherein in the case of the PDLC layer, the liquid crystal droplets or in the case of the SPD layer, the suspension droplets have an average size, determined as indicated in the specification, from 3 to 10 µm, wherein the relative standard deviation of the average size of the liquid crystal droplets or of the suspension droplets is more than 30% and not more than 80%, and
   wherein the window pane is a vehicle window pane.

2. The window pane according to claim 1, wherein the liquid crystal droplets are nematic at ambient temperature and have positive dielectric anisotropy.

3. The window pane according to claim 1, wherein a proportion of liquid crystal droplets in the PDLC layer, based on the total mass of liquid crystal droplets and polymer of the polymer matrix, is 40-70 wt.-%.

4. The window pane according to claim 1, wherein the polymer matrix is formed from a polymer of one or a plurality of vinyl or(meth)acrylate monomers and, optionally, vinyl or (meth)acrylate oligomers, an epoxy resin, or a urethane resin.

5. The window pane according to claim 1, wherein the polymer matrix is formed from at least one monofunctional vinyl compound, at least one difunctional vinyl compound, and, optionally, at least one mono-, di-, or polyfunctional vinyl oligomer.

6. The window pane according to claim 1, wherein at least one of the one or a plurality of polymer layers contains polyvinyl butyral, ethylene vinyl acetate, polyurethane, and/or mixtures thereof and/or copolymers thereof.

7. The window pane according to claim 1, wherein the vehicle window pane comprises, in this sequence, the first glass pane, at least one laminating layer as a first polymer layer, at least one protective layer as a second polymer layer, the PDLC layer with the two electrically conductive layers or the SPD layer with the two electrically conductive layers, at least one protective layer as a second polymer layer, at least one laminating layer as a first polymer layer, and the second glass pane.

8. The window pane according to claim 1, wherein the PDLC layer or the SPD layer is laterally sealed with an adhesive sealing compound and/or a thermoplastic strip.

9. The window pane according to claim 1, wherein the vehicle window pane is a motor vehicle window pane.

10. Vehicle, including at least one window pane according to claim 1.

11. A method comprising utilizing a window pane according to claim 1 as a vehicle window pane, as a glass roof, as a rear window, as a roof edge in the B field of a windshield, or as a rear or front side window.

12. A method comprising utilizing a vehicle window pane according to claim 11 for reducing the corona effect and, possibly, for reducing the rainbow effect in the transparent state of the pane.

13. The window pane according to claim 5, wherein the at least one monofunctional vinyl compound is a (meth)acrylate monomer, the at least one difunctional vinyl compound is a di(meth)acrylate monomer, and the at least one mono-, di-, or polyfunctional vinyl oligomer is a (meth)acrylate oligomer.

14. The window pane according to claim 6, wherein at least one of the one or a plurality of polymer layers contains polyvinyl butyral.

15. The vehicle according to claim 10, wherein the vehicle is a motor vehicle.

16. The window pane according to claim 1, wherein the vehicle window pane is a glass roof, a rear window or a side window of a vehicle.

17. The window pane according to claim 1, wherein the average size is from 4 to 10 µm.

* * * * *